United States Patent [19]

Plunkett

[11] Patent Number: 5,551,709
[45] Date of Patent: Sep. 3, 1996

[54] MULTIPLE LAYER CYLINDER HEAD GASKET WITH A WIRE RING

[75] Inventor: Tom P. Plunkett, Lemont, Ill.

[73] Assignee: Dana Corporation, Toledo, Ohio

[21] Appl. No.: 418,710

[22] Filed: Apr. 7, 1995

[51] Int. Cl.⁶ ........................................ F16J 15/08
[52] U.S. Cl. ........................ 277/235 B; 277/235 A
[58] Field of Search ........................... 277/180, 235 A, 277/235 B

[56] References Cited

U.S. PATENT DOCUMENTS

| | | |
|---|---|---|
| 3,473,813 | 10/1969 | Meyers et al. . |
| 4,335,890 | 6/1982 | Nicholson . |
| 4,369,980 | 1/1983 | Backlin ................................. 277/180 |
| 4,544,169 | 10/1985 | Cobb et al. . |
| 5,120,078 | 6/1992 | Udagawa ............................. 277/180 |
| 5,161,498 | 11/1992 | Miyaoh . |
| 5,169,163 | 12/1992 | Udagawa et al. . |
| 5,226,663 | 7/1993 | Miyaoh . |
| 5,255,926 | 10/1993 | Udagawa . |
| 5,277,434 | 1/1994 | Kestly et al. . |
| 5,360,219 | 11/1994 | Okuda et al. ....................... 277/235 B |

FOREIGN PATENT DOCUMENTS

| | | | |
|---|---|---|---|
| 500316 | 8/1992 | European Pat. Off. ........... 277/235 B |
| 574770 | 12/1993 | European Pat. Off. ........... 277/235 B |
| 627581 | 12/1994 | European Pat. Off. ........... 277/235 B |
| 633396 | 1/1995 | European Pat. Off. ........... 277/235 B |
| 4165167 | 6/1992 | Japan . |
| 6-26575 | 2/1994 | Japan ................................. 277/235 B |
| WO93/08420 | 4/1993 | WIPO ................................ 277/235 B |

Primary Examiner—William A. Cuchlinski, Jr.
Assistant Examiner—Scott W. Cummings
Attorney, Agent, or Firm—Rader, Fishman & Grauer PLLC

[57] ABSTRACT

A cylinder head gasket for an internal combustion engine includes a substantially flat center plate and first and second spring plates disposed on opposite sides of the center plate. The center plate has an opening therein. Both the first and second spring plates have openings therein aligned with and smaller than the opening of the center plate. The first and second spring plates thereby define wire ring retention portions of the spring plates extending radially inwardly from the edge of the center plate opening. A wire ring having a wire diameter greater than a thickness of the center plate is disposed between the ring retention portions of the spring plates. The spring plates have a substantially wave-like concentric embossment encircling the opening in each and radially proximate thereto. Clamping the gasket between two sealing surfaces forms a primary combustion seal at the wire ring, and forms a secondary combustion seal beyond the ring at the embossments.

4 Claims, 1 Drawing Sheet

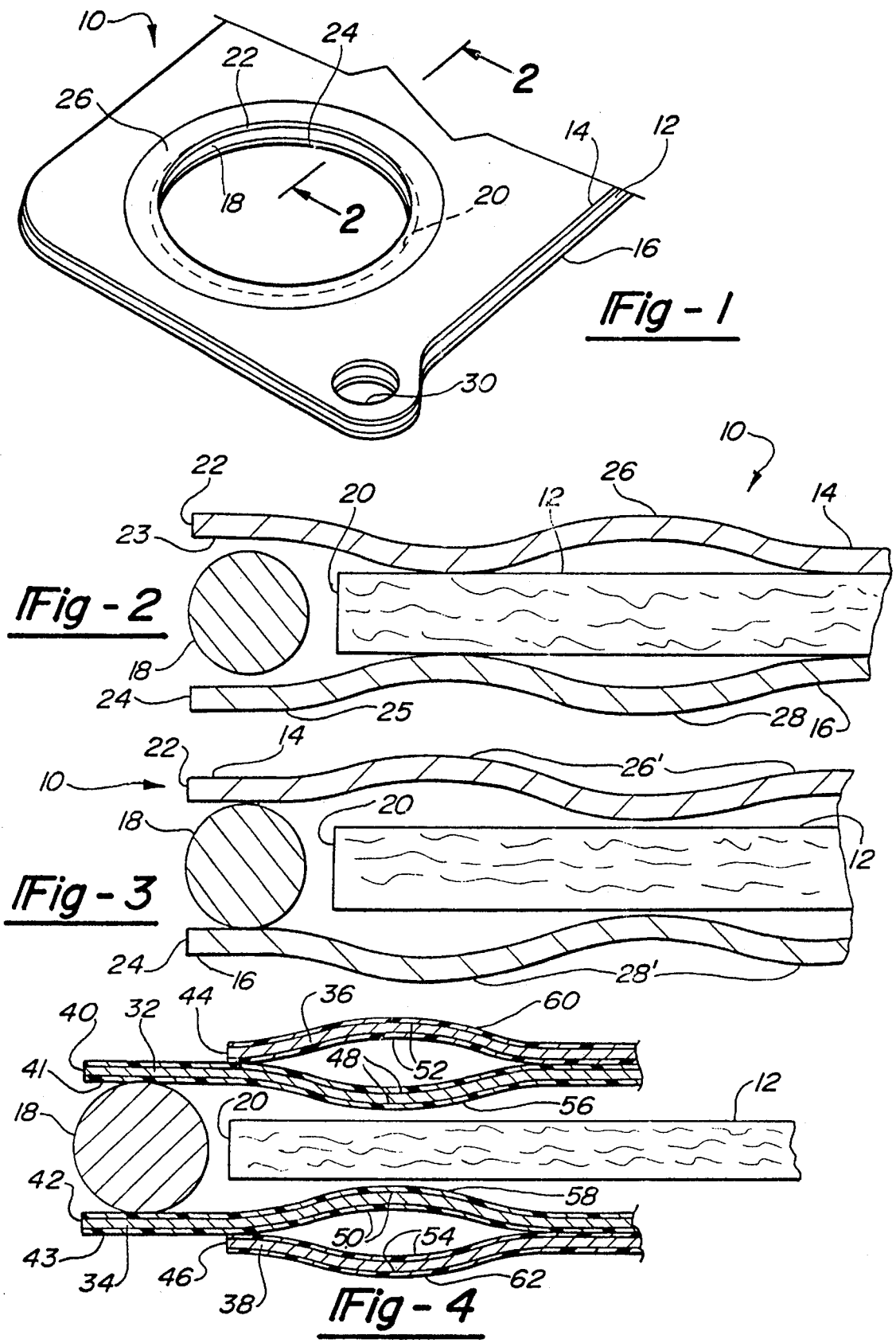
Sep. 3, 1996
U.S. Patent
5,551,709

MULTIPLE LAYER CYLINDER HEAD GASKET WITH A WIRE RING

BACKGROUND OF THE INVENTION

The present invention relates to improvements in multiple layer metal gaskets, alternatively called multi-layer metal or MLM gaskets.

Gaskets are often used as seals between mating mechanical components. One common application involves gasket placement between the engine block and the cylinder head of an internal combustion engine. Cylinder head gaskets typically extend around the cylinder bores to provide combustion seals, retaining the high temperature/high pressure gases of combustion within the cylinder bores. At the same time, the gaskets also seal fluid flow openings such as coolant and oil openings to prevent undesirable mixing of the latter engine fluids. In addition, such gaskets prevent leakage by sealing the areas around the bolts which connect the cylinder head and the engine block. The gasket bears the compressive load from a bolted connection of the mechanical components and relies upon such compression to provide a seal.

Diesel cycle internal combustion engines ("diesel engines") have higher compression ratios, and typically sustain compression forces in the combustion chamber greater than those sustained by conventional Otto cycle internal combustion engines ("gas engines"). Therefore, the combustion seal provided by the diesel engine gasket must sustain such higher pressures. The majority of cylinder head gaskets used in heavy duty diesel engines are of a composite type, employing a steel plate sandwiched between two fibrous composite layers.

Diesel engines are also distinguished from gas engines in that diesels typically employ cylinder liners which define the cylinder bores. These liners extend beyond a sealing surface of the engine block by a variable distance known as "cylinder stand-up". To compensate for the variation in cylinder stand-up, composite gaskets have incorporated wire rings between the steel plates which are located over the cylinder liners. Tightening of the cylinder head bolts flattens the wire rings to define a combustion seal around each cylinder bore between the head and the block.

Multi-layer metal gaskets are a known alternative to composite gaskets and offer superior performance and durability characteristics in gas engines. However, such gaskets are not well suited for use in diesel engines, because they do not adequately accommodate the variations in cylinder stand-up. Known multi-layer metal gaskets also tend to have a large number of constituent elements, often including complexly shaped metal formings. One complex forming commonly used with a wire ring is an outer plate which wraps around the ring, defining a ring retainer with a U-shaped cross section.

It is desired to provide a multi-layer metal gasket for use with both diesel and gas engines which provides a superior combustion seal. It is also desired to provide a multi-layer metal gasket with superior sealing capabilities having a minimum number of constituent elements, and with each element being relatively simple in form.

SUMMARY OF THE INVENTION

A disclosed cylinder head gasket for an internal combustion engine includes a substantially flat center plate defining an opening therein, a first spring plate disposed over one side of the center plate and a second spring plate disposed over the second side of the center plate. The first and second spring plates each have an opening aligned with and smaller than the opening of the center plate. The first and second spring plates thereby define ring retention portions extending radially inwardly from the opening of the center plate. A wire ring is disposed between the ring retention portions of the spring plates. The first and the second spring plates each have a substantially wave-like concentric embossment, each a mirror image of the other, encircling and radially proximate to their respective openings. When the gasket is clamped between two sealing surfaces, a primary combustion seal is formed between the gasket spring plates and the sealing surfaces at the wire fine and a secondary combustion seal is formed beyond the ring between the spring plates and the sealing surfaces at the embossments.

Inventive aspects of the present invention can be best understood from the following specification and drawings of which the following is a brief description.

BRIEF DESCRIPTION OF THE DRAWINGS

FIG. 1 is a perspective view of a gasket incorporating the present invention.

FIG. 2 is a cross-sectional view of an embodiment of the present invention taken alone line 2—2 of FIG. 1.

FIG. 3 is a cross-sectional view of a second embodiment of the present invention taken along line 2—2 of FIG. 1.

FIG. 4 is a cross-sectional view of a third embodiment of the present invention taken along line 2—2 of FIG. 1.

DESCRIPTION OF A DETAILED EMBODIMENT

A cylinder head gasket 10 illustrated in FIG. 1 includes a substantially flat center plate 12, and first and second spring plates 14, 16 disposed on opposite side of center plate 12. A wire ring 18, alternatively called a wire fire ring, is disposed between the spring plates 14, 16 adjacent the center plate 12.

The center plate 12 has an opening 20 extending therethrough. First spring plate 14 has an opening 22 aligned with but of smaller diameter than opening 20 of center plate 12, to thereby define a wire ring retention portion 23. Similarly, an opening 24 in the second spring plate 16 is sized to define a ring retention portion 25. Spring plates 14 and 16 have substantially wave-like concentric embossments 26, 28, respectively, each a mirror image of the other, encircling and radially proximate to openings 22, 24, as shown in FIG. 2. The embossments 26, 28 have at least one undulation with a concave or a convex cross section with an associated peak and valley. Wire ring 18 is disposed between the ring retention portions 23 and 25 adjacent to the center plate 12 within opening 20. The undeformed wire ring 18 has an outside diameter smaller than an inside diameter of opening 20, to define a radial gap therebetween. The wire diameter of the ring 18 is greater than the thickness of center plate 12.

When gasket 10 is clamped between the sealing surfaces of the cylinder block and the head (not shown), a primary combustion seal is formed at wire ring 18 and a secondary combustion seal is formed at embossments 26, 28. Wire ring 18 is disposed over a cylinder sleeve (not shown) which extends beyond the cylinder block sealing surface. As the head bolts (not shown) are tightened and the head is drawn toward the engine block, wire ring 18 is flattened by the sleeve to a more rectangular cross sectional shape. Wire ring 18 expands radially outwardly, closing the gap between itself and opening 20. The compressive force on wire ring 18 forms the primary combustion seal between the gasket spring plates 14, 16 and the sealing surfaces at the wire ring 18. Embossments 26, 28 act as springs and are flattened out as the sealing surfaces are drawn closer together. The localized sealing force induced by embossments 26, 28 is of much greater magnitude than the average clamping force acting on the gasket 10, thereby providing the secondary seal. The secondary sealing force is greatest where the peaks and valleys of the undulations contact the sealing surfaces.

An aperture 30, shown at a corner of the gasket 10 in FIG. 1, accommodates a through bolt or an alignment pin passing between an engine cylinder head and an engine block. No embossments are required around the aperture 30, there being no fluids to seal. Not shown are fluid passages for engine oil and cooling fluid. Those passages require sealing, and therefore concentric embossments in the first and second spring plates 14, 16 are preferably required.

The flat center plate 12 is preferably made from a low carbon steel. Spring plates 14 and 16 are preferably made from stainless steel with a temper range of ½ hard to full hard. The wire ring 18 is preferably made from either stainless steel or low carbon steel.

Although not shown in FIG. 2, both sides of spring plates 14, 16 can be provided with a polymeric coating. One possible polymeric coating is an elastomeric coating such as nitrile butadiene rubber. The elastomeric coating is needed to provide improved sealing between the spring plates 14, 16, the flat center plate 12 and the sealing surfaces. The coatings seal all mating surfaces. Another possible polymeric coating is polytetrafluoroethelyne (PTFE), sold under the registered trademark Teflon®.

The thickness and material of center plate 12 and spring plates 14, 16, as well as the precise shape of the embossments 26, 28, respectively, may be varied. Thus, gasket 10 may be customized to provide an optimal load balance between clamping loads and sealing loads which are produced during installation, and varied to suit a specific design application.

One alternative configuration of the embossments 26, 28 is found in a second embodiment of the invention, shown in FIG. 3. The spring plates 14, 16 have alternative embossments 26' and 28' respectively, in which the undulations are 180° out of phase with the undulations of the first embodiment, with peaks in place of valleys, and vice-versa.

Combination spring plates are shown in FIG. 4. A first spring plate 32 and a second spring plate 34 are disposed adjacent opposite sides of the flat center plate 12. As in the embodiments of FIGS. 2 and 3, the wire ring 18 is disposed between these spring plates. Third and fourth spring plates 36, 38 are used in combination with the first and second spring plates 32, 34, respectively. An opening 40 in the first spring plate 32 is smaller than opening 20 in the flat center plate 12 to define a ring retention portion 41. Similarly, there is an opening 42 in the second spring plate 34 equal in diameter to the opening 40 in the first spring plate 32 to define a ring retention portion 43. The third and fourth spring plates 36, 38 have openings 44, 46 substantially equal in diameter to the cylinder opening 20.

Both sides of first and second spring plates 32, 34 have a PTFE coating 48, 50, respectively. The third and fourth spring plates 36, 38, have, respectively, coatings 52, 54 of an elastomer such as nitrile butadiene rubber.

The first and second spring plates 32, 34 have embossments 56, 58 surrounding the openings 40, 42, respectively, which bow inwardly toward the center plate 12. The third and fourth spring plates 36, 38 have outwardly bowed embossments 60, 62 surrounding the openings 44, 46, and located, respectively, over embossments 56, 58. The aligned and oppositely bowed embossments 56, 58, 60, 62 cooperate to provide the sealing force with only half the strain that would be developed in a single plate. This results in a more durable gasket.

The preferred material for all four of the spring plates 32, 34, 36, 38 is high temper stainless steel with a temper range of ½ hard to full hard. The high temper stainless steel resists thinning of the ring retention portions 41, 43 where they engage the wire ring 18.

The use of both elastomeric and high temperature coatings is characterized as a dual coating system. The elastomeric coatings 52, 54 seal the gasket with the mating sealing surfaces of the head and the block. The PTFE coatings 48, 50 provide a desired lubricity between spring plates 32, 34 and the cylinder sleeve and the head. It is particularly desirable to have a lubricous high temperature coating, which is slippery with a low coefficient of friction, as provided by the PTFE, to protect those portions of a gasket surrounding each cylinder bore.

Preferred embodiments have been disclosed. A worker of ordinary skill in the art would realize, however, that certain modifications would come within the teaching of this invention. For example, it may be desirable to have more plates at a particular location. Additional functional layers, or spring plates, reduce the amount of strain per layer, thereby reducing fatigue cracks. Likewise, it may be preferred for a particular application to vary the types of coatings so that a gasket 10 with only first and second spring plates 14, 16 has an inside coating of PTFE for high temperature lubricity and an outer coating of elastomeric material for improved sealing.

The following claims should be studied in order to determine the true scope and content of the invention.

I claim:

1. A cylinder head gasket for an internal combustion engine comprising:

a substantially flat center plate having an opening therein;

a first spring plate disposed over the center plate and having an opening smaller than the opening in the center plate and aligned therewith and thereby defining a ring retention portion of the first spring plate extending radially inwardly from the opening in the center plate;

a second spring plate disposed over the center plate opposite the first spring plate having an opening smaller than the opening in the center plate aligned therewith and thereby defining a ring retention portion of the second spring plate extending radially inwardly from the opening in the center plate;

a substantially wavelike concentric embossment with a plurality of undulations in the first spring plate encircling the opening therein and radially proximate thereto;

a substantially wavelike concentric embossment with a plurality of undulations in the second spring plate encircling the opening therein and radially proximate thereto; and a wire ring having a wire diameter greater than a thickness of the center plate and disposed between the ring retention portions of the spring plates, the wire ring being radially exposed at an inside diameter;

wherein clamping the gasket between two sealing surfaces forms a primary combustion seal at the wire ring and forms a secondary combustion seal radially outwardly of the primary combustion seal.

2. A cylinder head gasket as claimed in claim 1, wherein there is:

an elastomeric coating over the first spring plate; and an elastomeric coating over the second spring plate.

3. A cylinder head gasket as claimed in claim 1, wherein there is:

a third spring plate disposed over an outside surface of the first spring plate and having an opening approximately the same size as the opening in the center plate and in alignment therewith and having a substantially wave-like concentric embossment encircling the opening; and a fourth spring plate disposed over an outside surface of the second spring plate and having an opening approximately the same size as the opening in the center plate and in alignment therewith and having a substantially wave-like concentric embossment encircling the opening wherein embossments in the third spring plate and the fourth spring plate are located and configured to cooperatively act, respectively, with the embossments of the first spring plate and the second spring plate to define the secondary combustion seal, thereby reducing a magnitude of strain of the first and second spring plates necessary to provide the secondary combustion seal.

4. A cylinder head gasket as claimed in claim 3, wherein there is:

a high temperature coating over the first spring plate;

a high temperature coating over the second spring plate;

an elastomeric coating over the third spring plate; and an elastomeric coating over the fourth spring plate, wherein the high temperature coatings minimize wear of the first and second plates and the elastomeric coating seals adjacent elements.

* * * * *